INAUDIBLE SUPERVISORY SIGNALING SYSTEM

Filed Dec. 15, 1958

INVENTORS: A. R. KOLDING
B. B. OLIVER

BY A. M. Hassell

ATTORNEY

United States Patent Office
3,070,667
Patented Dec. 25, 1962

3,070,667

INAUDIBLE SUPERVISORY SIGNALING SYSTEM

Aaron R. Kolding, Basking Ridge, and Billy B. Oliver, New Providence, N.J., assignors to Bell Telephone Laboratories, Incorporated, New York, N.Y., a corporation of New York Filed Dec. 15, 1958, Ser. No. 780,373
10 Claims. (Cl. 179—84)

This invention relates to switching apparatus. Although the principles underlying the invention may find expression in a variety of applications, the particular embodiment selected for this illustrative description is presented in connection with supervisory signaling equipment.

Where cooperative elements are interconnected over transmission facilities, it is often necessary to transmit supervisory control signals therebetween in order to effect desired coordination. In applications in which other signals are transmitted over the same transmission channel, it may be desirable to separate the signals or to block one from progress beyond some predetermined point. Thus, for example, in telephone communication systems it is desired to prevent supervisory signals from being heard by conversationalists.

In conventional telephone practice, one talking channel is exclusively assigned to each pair of talkers and supervisory signals are therefore relatively few in number. Accordingly, it has become practicable in most instances to transmit the supervisory signals before and after the talking interval, thereby permitting effective disconnection of the customers' sets during the signaling period. Even when the supervisory signals are heard, they do not interfere with conversation since, at the time they are transmitted, the talking path will not have been completed. However, in certain telephone systems, supervisory signals are transmitted over the talking channel during the course of a conversation. Thus, for example, in the Time Assignment Speech Interpolation Apparatus disclosed in the copending application of F. A. Saal and I. Welber, Serial No. 686,468, filed September 26, 1957, and in apparatus disclosed in the copending application of A. R. Kolding and G. N. Packard, Serial No. 762,779, filed September 23, 1958, supervisory signals are at times transmitted at the beginning and end of talk spurts, and were it not for apparatus which blocks these signals, at least some of them would be audible to one of the conversationalists.

Occasions have arisen in the past when it has been desired to transmit signaling information without the signals themselves being heard at the terminal equipment or, where no listeners are connected, without such signals evoking response by certain terminal apparatus. Various proposals have been made to accomplish these objectives, among which is the utilization for signaling of a narrow band of frequencies cut out of the transmission channel. Another involves the transmission of signaling information via frequencies either higher or lower than those of the band set aside for speech or other purposes. As adapted to telephone practice, each of these proposals involves the inclusion of a rejection filter to prevent the unwanted signals from reaching the customer's telephone set, and therefore in each the channel bandwidth is narrowed. Since, in order to provide the most economical service, channels normally do not include excess bandwidth, any narrowing tends to degrade the quality of the transmitted intelligence.

If an instantaneously-responsive switch could be constructed, it could be connected serially in the transmission channel and could respond to the front slope of an unwanted signal by instantly opening, thereby blocking further signal progress. However, all switches and signal receivers are characterized by having some inherent delay in response. Accordingly, a signal-responsive switch is not effective completely to block progress of a signal unless the signal can be delayed sufficiently to give the switch enough time to operate before the signal arrives at the switch contacts. The subject-matter of this invention is directed to an arrangement in which this delay is advantageously provided.

It is one general object of this invention to improve supervisory signaling apparatus.

It is another object of this invention to prevent supervisory signals from passing predetermined points in the signaling circuits.

It is a further object of this invention to effect such prevention without reducing channel bandwidth.

Consequently, in accordance with one feature of the invention, signal delaying apparatus is interposed serially between a communication channel and its terminal equipment, and signal-responsive apparatus, which is at certain times connected to the junction of the communication channel and the delaying apparatus, is arranged to respond to supervisory signals by disconnecting the terminal equipment before the supervisory signals emerge from the delay apparatus.

In accordance with another feature of the invention, in systems in which supervisory signals are of known duration, the signal-responsive apparatus may be arranged to reconnect the terminal equipment a predetermined interval subsequent to the receipt of the signal, the predetermined interval being selected to allow for the expiration of the signal before reconnection.

In accordance with yet another feature of the invention, the signal-responsive apparatus may be arranged to respond to a supervisory signal not only by disconnecting the terminal equipment but in addition by transferring its own connection from the previously-mentioned junction to the opposite end of the delaying apparatus where it is effective to maintain terminal equipment disconnection until the signal has expired. When the signal has expired, the signal-responsive apparatus may be arranged to reconnect the terminal apparatus and to transfer its own connection to its original point.

In accordance with still another feature of the invention, the signal-responsive apparatus may be arranged to disconnect the terminal equipment and transfer its own connection but may be additionally arranged to effect reconnection and retransfer only in response to another supervisory signal.

These and other objects and features of the invention will be apparent from the following detailed description, by way of example, with reference to the drawing in which.

Figure 1:
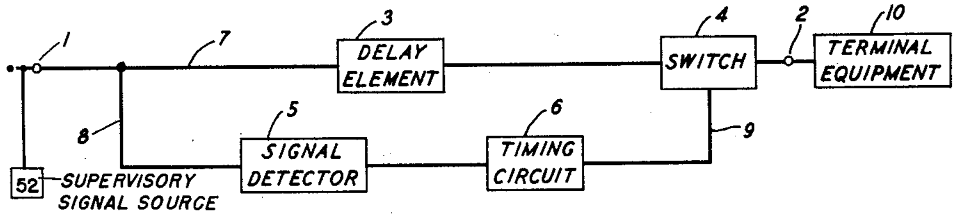
FIG. 1 is a block diagram of one elementary embodiment of the invention in which a signal-isolating switch is opened during a predetermined interval established by a timing circuit.

Now referring more specifically to FIG. 1, it will be seen that therein disclosed is an input terminal 1, an output terminal 2, a signal delaying element 3, a switch 4, a signal detector 5, a timing circuit 6, and terminal equipment 7 which may include a receiver. Of these, the delay element 3 and switch 4 are serially connected between input and output terminals 1 and 2; whereas the signal detector 5 is connected to input terminal 1 and the input conductor 7 of delay element 3 via conductor 8. The output of the signal detector 5 is connected to the input of timing circuit 6, and the output of the latter is connected via conductor 9 to the control terminal of switch 4. Input terminal 1 is connected, usually by an extended signal transmission system, to a supervisory signal source 52. Signal delaying element 3 might comprise a delay line of the type disclosed in W. R. Lundry Patent 2,859,414, issued November 4, 1958, or any other delay line suitable for the signals being used. Similarly, switch 4 might comprise an electronic switch of the type disclosed in G. Elliott Patent 2,810,081, issued October 15, 1957, or any known equivalent thereof. Signal detector 5 might comprise a detector of the type disclosed in W. W. Fritschi et al. Patent 2,765,371, issued October 2, 1956.

In operation, it is anticipated that supervisory signals from source 52 will be received at terminal 1 and that they will be used by other apparatus (not shown) to perform any one of the multitude of operations for which such signals are employed. However, since it is desired to prevent them from reaching the terminal equipment 10, the delay element 3 interposes a sufficient time interval to permit the signal detector 5 and timing circuit 6 to open switch 4 before the supervisory signal has emerged from element 3, and timing circuit 6 retains switch 4 in the open position until after the signal has expired.

The circuits of FIG. 1 are simple and provide the required blocking of the supervisory signal. However, it will be apparent that the period of time during which the timing circuit 6 opens switch 4 must be correlated with the length of the supervisory signal. Otherwise, the supervisory signal might be present when switch 4 is reclosed and a part of the signal might be extended to the terminal equipment 10. Although this could be prevented by causing the timing circuit to open the switch during the interval greater than the longest signal expected to be received, it will be apparent that if the signals are of various lengths, the channel extending from terminal 1 via delay element 3, switch 4, and terminal 2 to the equipment 10 will be interrupted for a greater portion of the total time than is necessary for the mere exclusion of the supervisory signals. Accordingly, a more refined embodiment is disclosed in FIG. 2. There, the periods during which switch 11 is open are directly related to the lengths of the supervisory signals irrespective of how long or short they may be.

Figure 2:
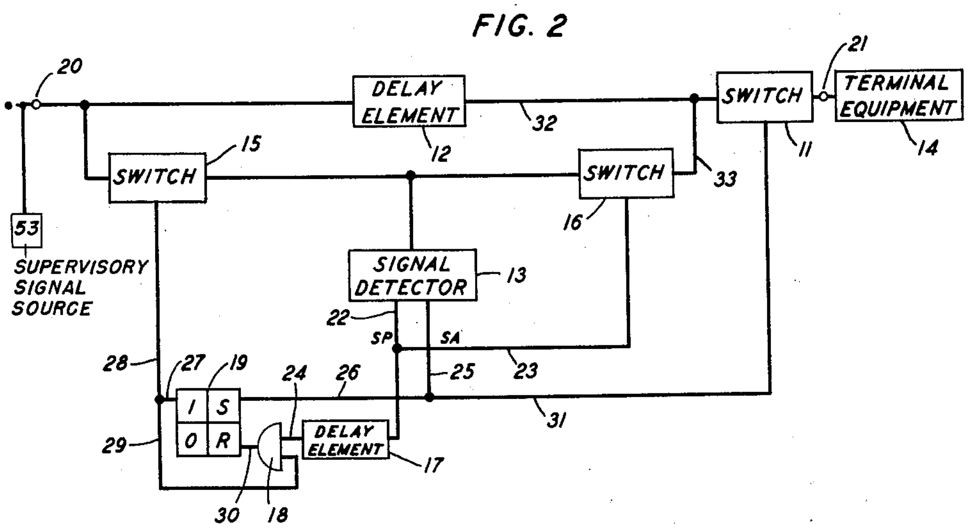
FIG. 2 is a block diagram of an embodiment in which switching intervals are functions of the durations of supervisory signals.

In FIG. 2, source 53 corresponds to source 52, terminal 20 corresponds to terminal 1, delay element 12 corresponds to element 3, switch 11 to switch 4, terminal 21 to terminal 2, signal detector 13 to detector 5, and terminal equipment 14 to equipment 10. Other elements include switches 15 and 16, delay element 17, AND circuit 18, and flip-flop 19. Since delay element 17 is connected to the output of detector 13, a simple resistive-capacitive timing circuit is usually adequate for this delaying function. Flip-flop 19 is a bistable multivibrator which might be of the type disclosed in J. R. Harris Patent 2,906,894, issued September 29, 1961, or a similar circuit.

Normally, when the supervisory signals from source 52 are not being received, switch 11 is closed to serially interconnect terminal equipment 14 with input terminal 20 through delay element 12, thereby to permit receipt of non-supervisory signals by the terminal equipment 14. During this interval the signal detector 13 is effective to apply a potential to "Signal Absent" lead 25 and to remove any potential that may have existed on "Signal Present" lead 22. Potential conducted over leads 25 and 31 is effective to hold switch 11 closed and to switch flop-flop 19 to its set, or 1, state. Potential conducted from the "1" terminal via conductors 27 and 28 closes switch 15 and enables AND circuit 18. When a supervisory signal from source 52 is received at input terminal 20, it passes over one obvious path to delay element 12 and over another obvious path through switch 15 to signal detector 13.

Detector 13 may be any one of a wide variety of supervisory signal receivers, the characteristics of the detector being selected to provide response to the particular type of supervisory signals employed. Thus, for example, if multifrequency supervisory signals are used, the signal detector might be of a different type than that which would be utilized to receive D.C. pulse signals. Irrespective of which type is employed, the detector responds to the supervisory signal by transferring a potential from "Signal Absent" lead 25 to "Signal Present" lead 22 whence it is conveyed over one path to the input terminal of delay element 17 and over another path via conductor 23 to the control terminal of switch 16. Switch 16 responds by immediately closing. In the meantime, switch 11 will have been opened by the removal of potential from conductor 31.

After a brief interval, the supervisory signal emerges from delay element 12 only to find switch 11 open. However, switch 16 is closed and the signal is extended over the obvious path to signal detector 13. A moment later, the potential applied to delay element 17 appears at conductor 24 whence it is extended to the upper input conductor of AND circuit 18. Since the lower input terminal of AND circuit 18 is activated, the potential present upon conductor 24 will result in the emission of a corresponding potential which will be extended via conductor 30 to the reset terminal R of flop-flop 19. The flip-flop is therefore switched to its off state, thereupon removing potential from conductor 28 to open switch 15 and removing potential from conductor 29 to disable AND circuit 18.

It will now be apparent that the input terminal of signal detector 13 is advantageously switched from one side of the delay element 12 to the other without loss of supervisory signal continuity. Thus, the signal detector 13 remains activated until the delayed supervisory signal on conductor 32 has expired. When this has occurred, potential is removed from "Signal Present" lead 22 and is reapplied to "Signal Absent" conductor 25 whereupon switch 11 is immediately reclosed and flip-flop 19 is set to its 1 state. In addition, switch 16 is opened and switch 15 reclosed. The path from terminal 20 through delay element 12 and switch 11 to terminal equipment 14 is now prepared to conduct nonsupervisory information until another supervisory signal is received.

Figure 3:
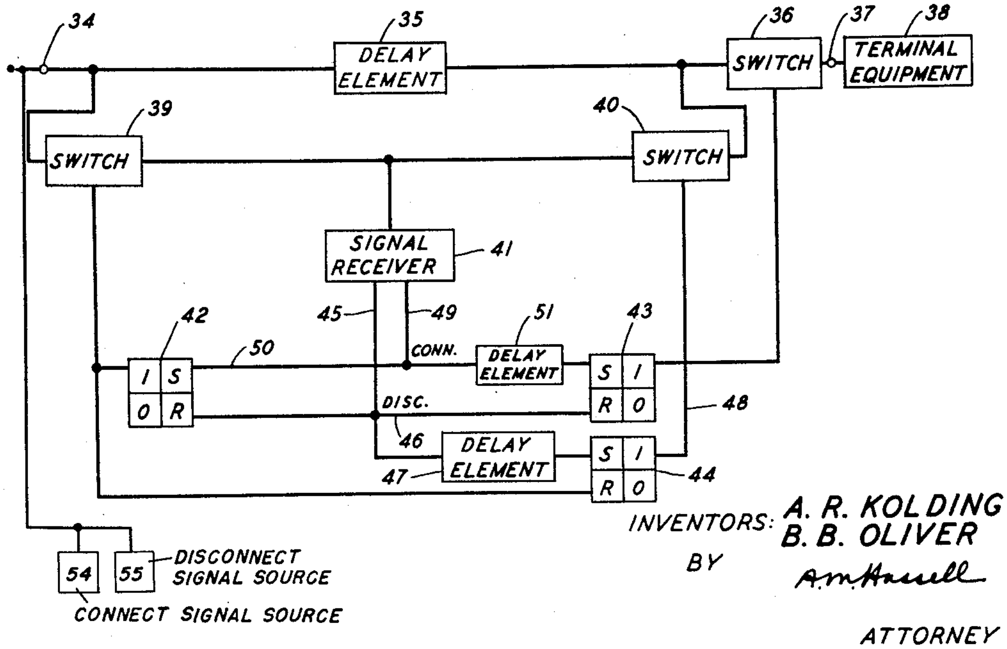
FIG. 3 is a block diagram of an embodiment in which switching connections and disconnections are made respectively in response to "connect" and "disconnect" supervisory signals.

FIG. 3 depicts an embodiment in which the terminal equipment 38 is connected and disconnected by switch 36 in response to the receipt of connect and disconnect supervisory signals. From a reference to FIG. 3 it will be seen that terminal 34 corresponds to terminal 20, delay element 35 to delay element 12, switch 36 to switch 11, terminal 37 to terminal 21, equipment 38 to equipment 14, switch 39 to switch 15, and switch 40 to switch 16. Signal receiver 41, though somewhat similar to signal detector 13, is arranged to respond differently since in the embodiment of FIG. 3 it is desired to distinguish between two different supervisory signals.

In certain types of known apparatus it is desired selectively to transmit "connect" and "disconnect" supervisory signals, and it is necessary to prevent the path from terminal 34 to equipment 38 from being completed during the interval elapsing between the receipt of a disconnect and a connect signal. Accordingly, switch 36 is not permitted to reclose at the expiration of a disconnect signal, and the manner in which this is accomplished will now be explained.

If it may be assumed that the most recently received supervisory signal is of the "connect" variety from connect signal source 54, switches 39 and 36 will be closed, switch 40 will be open, flip-flops 42 and 43 will be in the set, or 1 state, and flip-flop 44 will be in the reset, or 0 state. When a supervisory disconnect signal is received from disconnect signal source 55, it is conducted through switch 39 to signal receiver 41 where it is effective to cause the application of a potential to "disconnect" conductors 45 and 46. Flip-flops 42 and 43 are thereupon immediately switched to their reset, or 0, states thereby opening switches 36 and 39. After the supervisory signal has decayed, the potential applied to conductor 45 emerges from delay element 47 to switch flip-flop 44 to its set, or 1, state. Accordingly, a potential is conducted via lead 48 to switch 40 and switch 40 is closed. The circuits are now stabilized and await the receipt of a "connect" signal.

When a supervisory connect signal is received from source 54, it is passed through delay element 35 and switch 40 to signal receiver 41 where it is effective to cause the application of a potential to "connect" conductors 49 and 50. Via conductor 50 it is effective to switch flip-flop 42 to its set, or 1, state thereby reclosing switch 39 and resetting flip-flop 44 to its 0 state. Accordingly, potential is removed from conductor 48 to open switch 40. After a brief delay interposed by element 51 (in order to permit the supervisory connect signal to completely expire before reclosing switch 36), flip-flop 43 is switched to its set, or 1, state thereby reclosing switch 36 and reestablishing a path from input terminal 34 to the terminal equipment 38. The circuits of FIG. 3 are now stabilized and will remain in the states indicated until a supervisory disconnect signal is received from source 55.

In the previous treatment of the circuits of FIG. 3, the element 36 has been described as a simple switch and element 41 as a simple signal receiver. In complex adaptations (such as, for example, that of TASI to which reference is made above), the switch 36 may have a plurality of selectable output conductors instead of the single output conductor 37. In such embodiments, the signal receiver 41 may include a plurality of pairs of "connect" and "disconnect" conductors, each pair being specifically referable to a different one of the switch 36 output conductors. In this event, the "connect" and "disconnect" supervisory signals would be severally distinct with respect to the connect or disconnect function to be performed and to the identity of the switch output conductor involved.

While we have illustrated our invention by the foregoing description, it is not intended to limit its application to the specific apparatus and particular arrangements shown and described. Various applications, modifications, and adaptations of the invention will readily occur to those skilled in the art.

The terms and expressions which we have employed in reference to the invention are used as terms of description and not of limitation, and we have no intention in the use of such terms and expressions of excluding equivalents of the features shown and described or parts thereof, but on the contrary, intend to include therein any and all equivalents, modifications, and adaptations which may be employed without departing from the spirit of the invention.

What is claimed is:

1. Apparatus comprising an input terminal and an output terminal, a signal delaying element having an input conductor and an output conductor and arranged to delay a signal for a predetermined period, a switch having an input conductor and an output conductor, means connecting said input terminal to the input conductor of said delaying element, means connecting the output conductor of said delaying element to the input conductor of said switch, means connecting the output conductor of said switch to said output terminal, means normally connected to said input terminal and responsive to the receipt of a selected signal at said input terminal for opening said switch before said signal emerges from said delaying device, and means responsive to said receipt of said selected signal for disconnecting said last-mentioned means from said input terminal and for connecting said last-mentioned means to the output conductor of said delaying element.

2. Apparatus comprising a signal delaying element having an input conductor and an output conductor and arranged to delay a signal for a predetermined period, a switch, means connecting said output conductor to said switch, and means normally connected to said input conductor and responsive to the receipt of a selected signal when so connected for opening said switch until said signal has emerged from said delaying element, said last-mentioned means being further responsive to the receipt of said signal to disconnect itself from said input conductor and to connect itself to said output conductor.

3. Apparatus comprising an input terminal and an output terminal, a signal delaying element having an input conductor and an output conductor, a first switch having two terminals connectable and disconnectable by said switch, means connecting said input terminal to said input conductor, means connecting said output conductor to one of said two terminals of said switch, means connecting said output terminal to the other of said two terminals of said switch, a second switch connected to said input conductor, a third switch connected to said output conductor, and a signal receiver connected to said second switch and said third switch responsive to the receipt of a selected signal at said input terminal when said second switch is closed for opening said first switch, for opening said second switch, and for closing said third switch.

4. Apparatus comprising a signal delaying element having an input conductor and an output conductor; a first switch having two terminals connectable and disconnectable by said switch; means connecting said output conductor to one of said two terminals of said switch; a second switch connected to said input conductor; a third switch connected to said output conductor; and a signal receiver connected to said second switch and said third switch responsive to the receipt of a selected signal at said input conductor when said second switch is closed for opening said first switch, for opening said second switch, and for closing said third switch; said signal receiver being responsive to the receipt of another selected signal at said input conductor when said third switch is closed for opening said third switch, for closing said first switch, and for closing said second switch.

5. In combination, a signaling path, delay means interposed in said path, a source of signals connected to said path, switching means connected to the output of said delay means, signal detecting means connected to said path for detecting signals from said source, means responsive to said signal detecting means for controlling said switching means, said last-named means also being operative to transfer the connection of said detecting means between the input and the output of said delay means, and terminal equipment connected to said switching means.

6. In combination, a source of supervisory signals, terminal equipment, a transmission medium interconnecting said source and said terminal equipment, delay means interposed in said transmission medium, supervisory signal detecting means normally connected to the input of said delay means, means responsive to said detecting means for disabling said terminal equipment and for connecting said detecting means to the output of said delay means when a signal is present, and means responsive to said detecting means for enabling said terminal equipment and for connecting said detecting means to the input of said delay means when said signal expires.

7. In combination, a normally disabled signal transmission line, a source of connect and disconnect supervisory signals connected to said line and signal delay means interposed in said transmission line, connect and disconnect signal receiving means, means responsive to the receipt of each connect signal from said source for enabling said transmission line and for connecting said signal receiving means to the input terminal of said delay means, and means responsive to the receipt of each disconnect signal from said source for disabling said transmission line and for connecting said signal receiving means to the output terminal of said delay means.

8. A signaling system comprising a source of distinctive connect and disconnect supervisory signals, terminal equipment, a transmission line interconnecting said source and said terminal equipment, delay means interposed in said transmission line, means for detecting said connect and disconnect supervisory signals, first control means responsive to said detecting means for enabling said terminal equipment and for connecting said detecting means to the input of said delay means each time a connect signal is received, and second control means responsive to said detecting means for disabling said terminal equipment and for connecting said detecting means to the output of said delay means each time a disconnect signal is received.

9. The signaling system according to claim 8 wherein said first control means includes means for delaying the enablement of said terminal equipment until after said connect signal has expired.

10. The signaling system according to claim 8 wherein said second control means includes means for disabling said terminal equipment before said disconnect signal traverses said delay means.

References Cited in the file of this patent

UNITED STATES PATENTS 2,830,128 Radcliffe ---------------- Apr. 8, 1958
2,883,473 McDermott ------------- Apr. 21, 1959

FOREIGN PATENTS 1,088,239 France ------------------ Sept. 8, 1954